United States Patent [19]

Funahashi et al.

[11] Patent Number: 4,998,345

[45] Date of Patent: Mar. 12, 1991

[54] METHOD OF MANUFACTURING FLUID-FILLED ELASTIC MOUNT HAVING PRESSURE-RECEIVING AND EQUILIBRIUM CHAMBERS

[75] Inventors: Yoshiki Funahashi, Iwakura; Nobuo Matsumoto, Nagoya; Keita Shiraki, Kasugai, all of Japan

[73] Assignee: Tokai Rubber Industries, Ltd., Japan

[21] Appl. No.: 543,435

[22] Filed: Jun. 26, 1990

[51] Int. Cl.⁵ .............................................. B23P 21/00
[52] U.S. Cl. ..................................... 29/897.2; 29/436; 29/446; 29/508; 248/562; 248/636; 267/140.1
[58] Field of Search ....................... 29/897.2, 446, 454, 29/469.5, 434, 436, 437, 439, 506, 508, 521, 515, 469; 248/562, 636; 267/140.1

[56] References Cited

U.S. PATENT DOCUMENTS

| 4,865,299 | 9/1989 | Goto | 248/562 |
| 4,871,151 | 10/1989 | Kanda | 248/562 |
| 4,871,152 | 10/1989 | Funahashi | 248/562 |

FOREIGN PATENT DOCUMENTS

| 48-36151 | 11/1973 | Japan . |
| 52-16554 | 5/1977 | Japan . |
| 62-196434 | 8/1987 | Japan . |
| 63-289349 | 11/1988 | Japan . |

Primary Examiner—P. W. Echols
Assistant Examiner—David P. Bryant
Attorney, Agent, or Firm—Oliff & Berridge

[57] ABSTRACT

A method of manufacturing a fluid-filled elastic mount including an elastic body connecting an inner and an outer sleeve, and having a pressure-receiving and an equilibrium chamber which are filled with a non-compressible fluid and communicate with each other through an orifice. The method includes preparing an inner unit having an intermediate sleeve connected to the inner sleeve by the elastic body, and a pocket formed in the elastic body such that the pocket is open through the intermediate sleeve and has an axial dimension defined by axially opposite side walls of the elastic body. The method further includes placing the inner unit within a mass of the fluid, and press-fitting the outer sleeve on the inner unit so as to provide the pressure-receiving chamber filled with the fluid, while applying an axial force to at least one of the side walls in the axial direction of the mount, to thereby cause elastic deformation of the side wall or walls so as to expand into the pocket. The axial force is removed from the side wall or walls to increase the volume of the pressure-receiving chamber and thereby reduce the volume of the equilibrium chamber.

8 Claims, 10 Drawing Sheets

METHOD OF MANUFACTURING FLUID-FILLED ELASTIC MOUNT HAVING PRESSURE-RECEIVING AND EQUILIBRIUM CHAMBERS

BACKGROUND OF THE INVENTION

1. Field of the Invention

The present invention relates in general to a method of manufacturing a fluid-filled elastic mount adapted to effect vibration damping based on resonance of a non-compressible fluid through an orifice passage between a pressure-receiving chamber and an equilibrium chamber. More particularly, this invention is concerned with an improved method suitable for manufacturing such a fluid-filled elastic mount whose equilibrium chamber is permitted to undergo a sufficiently large amount of volumetric change and thereby enables the elastic mount to exhibit enhanced damping capability and stability.

2. Discussion of the Prior Art

A cylindrical fluid-filled elastic mount is known as a vibration damping member interposed between two members of a vibration system for flexibly connecting these two members. An example of such a cylindrical fluid-filled elastic mount is disclosed in laid-open Publication Nos. 48-36151 and 52-16554 of unexamined Japanese Patent Applications. The elastic mount disclosed in these publications includes an elastic body interposed between an inner and an outer sleeve for flexibly connecting the two sleeves, and has a pair of fluid chambers which are formed between the inner and outer sleeves in diametrically opposite positions of the sleeves and which are filled with a suitable non-compressible fluid. These two fluid chambers communicate with each other through an orifice passage, so that vibrations applied between the inner and outer sleeves in the diametric direction of the mount may be damped or isolated based on resonance of the fluid flowing through the orifice.

In the cylindrical fluid-filled elastic mount constructed as described above, the elastic body is usually a generally annular member whose inner and outer surfaces are held in contact with substantially the entire circumferences of the inner and outer sleeves. This arrangement tends to cause an excessively large amount of tensile strain to occur in a local portion or portions of the annular elastic body when the elastic mount is installed between two members for flexibly connecting these two members, for instance when the elastic mount is used as an engine mount for flexibly supporting an engine unit on a vehicle body. Namely, the inner or outer sleeve of the installed elastic engine mount receives the weight of the engine unit, as a static load which is permanently applied to the elastic body during the entire life of service for damping a dynamic vibrational load. Therefore, the known fluid-filled elastic mount suffers from insufficient durability of the elastic body.

In the light of the drawback of the known fluid-filled elastic mount described above, an improved arrangement has been proposed as disclosed in laid-open Publication Nos. 62-196434 and 63-289349 of unexamined Japanese Patent Applications. In the proposed improved arrangement, the pair of fluid chambers consist of a pressure-receiving chamber which initially receives a dynamic vibrational load, and a variable-volume equilibrium chamber which is at least partially defined by a flexible diaphragm. More specifically, the pressure-receiving chamber is formed in a portion of the elastic body which is subject to a compressive stress due to the static load. However, no fluid chamber is formed in a portion of the elastic body which is subject to a tensile stress due to the static load. That is, the equilibrium chamber partially defined by the flexible diaphragm need not be defined by any portion of the elastic body, and therefore the elastic body may be located only in a portion of the space between the inner and outer sleeves, which is subject to the compressive stress but not subject to the tensile stress due to the static load. Thus, the elastic body used in the proposed arrangement is substantially free from a tensile strain due to the static load.

However, a study by the present applicants on the above-proposed fluid-filled elastic mount revealed some problems in terms of the durability and damping capability, as described below.

Namely, the volume of the pressure-receiving chamber is reduced when the elastic mount is installed so as to receive the static load, for example, the weight of an engine unit of a motor vehicle, which acts on the outer sleeve. Consequently, the fluid is forced to flow from the pressure-receiving chamber into the equilibrium chamber through the orifice passage, whereby the volume of the equilibrium chamber is increased such that a thin rubber layer or flexible diaphragm partially defining the equilibrium chamber is displaced radially outwardly of the mount. That is, the flexible diaphragm of the installed elastic mount has experienced a certain amount of elastic deformation or displacement due to the static load, prior to receiving a dynamic vibrational load. This condition is undesirable for the durability of the flexible diaphragm, and reduces the maximum amount of elastic deformation of the flexible diaphragm due to the dynamic load. As a result, the maximum amount of volumetric change of the equilibrium chamber, and the fluid flow between the pressure-receiving and equilibrium chambers through the orifice passage are rather limited. Hence, the equilibrium chamber fails to completely attain the assigned function, and the elastic mount is not capable of exhibiting desired vibration damping characteristics, particularly where the amplitude of the input vibrations is relatively large.

SUMMARY OF THE INVENTION

It is therefore an object of the present invention to provide an improved method suitable for manufacturing a fluid-filled elastic mount which exhibits enhanced vibration damping capability and stability, with an equilibrium chamber having a sufficiently large maximum amount of volumetric change when the elastic mount is installed in position while receiving the static load.

The above object may be achieved according to the principle of the present invention, which provides a method of manufacturing a fluid-filled elastic mount which includes an elastic body flexibly connecting an inner and an outer sleeve which are radially spaced apart from each other, means for defining a pressure-receiving chamber and a variable-volume equilibrium chamber which are formed between the inner and outer sleeves and which are filled with a non-compressible fluid, and means for defining an orifice passage for fluid connection between the pressure-receiving and equilibrium chambers, the equilibrium chamber being at least partially defined by a flexible diaphragm, comprising the steps of: (a) preparing an inner unit including the inner sleeve and an intermediate sleeve disposed radially outwardly of the inner sleeve, such that the inner and intermediate sleeves are flexibly connected to each other by the elastic body formed therebetween, and such that a pocket is formed in the elastic body such that the pocket is open on an outer circumferential surface of the inner unit through the intermediate sleeve and such that an axial dimension of the pocket in an axial direction of the elastic mount is defined by opposite side walls of the elastic body which are opposed to each other in the axial direction; (b) placing the inner unit within a mass of the non-compressible fluid, and press-fitting the outer sleeve on the inner unit so as to fill the pocket with the fluid and fluid-tightly close the pocket for thereby providing the pressure-receiving chamber, while applying an axial force to at least one of the opposite side walls of the elastic body in the axial direction, to thereby cause elastic deformation of the at least one side wall so as to expand into the pocket; and (c) removing the axial force from the at least one side wall, to permit the at least one side wall to elastically deform so as to increase the volume of the pressure-receiving chamber, thereby reducing the volume of the equilibrium chamber.

According to the method of the present invention described above, the flexible diaphragm partially defining the equilibrium chamber is displaced in a radially inward direction of the mount, so as to reduce the volume of the equilibrium chamber, when the axial force applied to the side wall or walls of the elastic body is removed. Therefore, when the manufactured elastic mount is installed so as to receive the static load, the flexible diaphragm is displaced in the radially outward direction, but the amount of elastic deformation is held relatively small because of the volumetric reduction of the equilibrium chamber when the axial force is removed from the side wall or walls of the elastic body after the pressure-receiving and equilibrium chambers are filled with the non-compressible fluid. Hence, the equilibrium chamber of the elastic mount as installed has a relatively large maximum amount of elastic deformation of the flexible diaphragm and an accordingly large maximum amount of volumetric change of the equilibrium chamber, upon application of dynamic vibrational loads during use of the elastic mount.

Thus, the present method assures improved durability of the flexible diaphragm, and permits the equilibrium chamber to attain the assigned function with the relatively large maximum amount of volumetric change, even where the input vibrations have a comparatively large amplitude. Therefore, the fluid-filled elastic mount manufactured by the present method has improved damping capability and stability, based on resonance of the fluid flowing through the orifice passage between the pressure-receiving and equilibrium chambers.

To apply the axial force to the side wall or walls of the elastic body, one presser rod or two presser rods may be moved in the axial direction of the elastic mount while one end of the presser rod is held in abutting contact with the corresponding side wall. For example, where the axial force is applied to both of the opposite side walls of the elastic body, two presser rods are moved toward each other in the axial direction of the elastic mount, with one end of each rod abutting on the corresponding side wall.

The outer sleeve may be press-fitted on the inner unit while the outer sleeve is subjected to a radially inward drawing operation and while the axial force is applied to the at least one side wall of the elastic body.

The inner unit may be prepared such that a rebound stop is inserted between a portion of the intermediate sleeve which partially defines the equilibrium chamber, and the inner sleeve, so as to give a predetermined amount of pre-compression to a portion of the elastic body in which the pocket is formed.

The inner unit may also be prepared such that the flexible diaphragm is secured to an orifice-defining member which is fitted on the intermediate sleeve such that the flexible diaphragm and the intermediate sleeve cooperate to define the equilibrium chamber when the outer sleeve is fitted on the inner unit.

The inner unit may be prepared so as to form the elastic body such that the inner and intermediate sleeves are eccentric with respect to each other such that a radial distance between a radial center of the inner sleeve and the intermediate sleeve in a direction in which a static and a dynamic load are applied to the pressure-receiving chamber is smaller on the side of the flexible diaphragm than on the side of the pocket.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
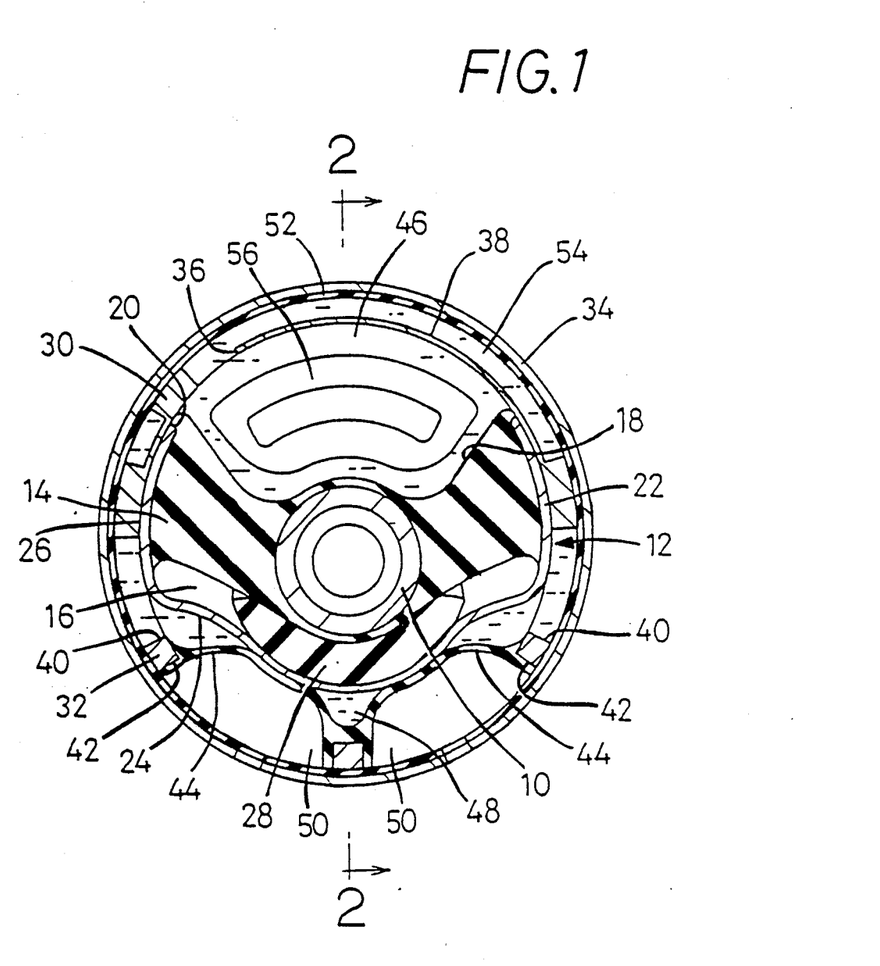
FIG. 1 is an elevational view in transverse cross section of a vehicle engine mount which is manufactured according to one embodiment of the method of the present invention.
Figure 2:
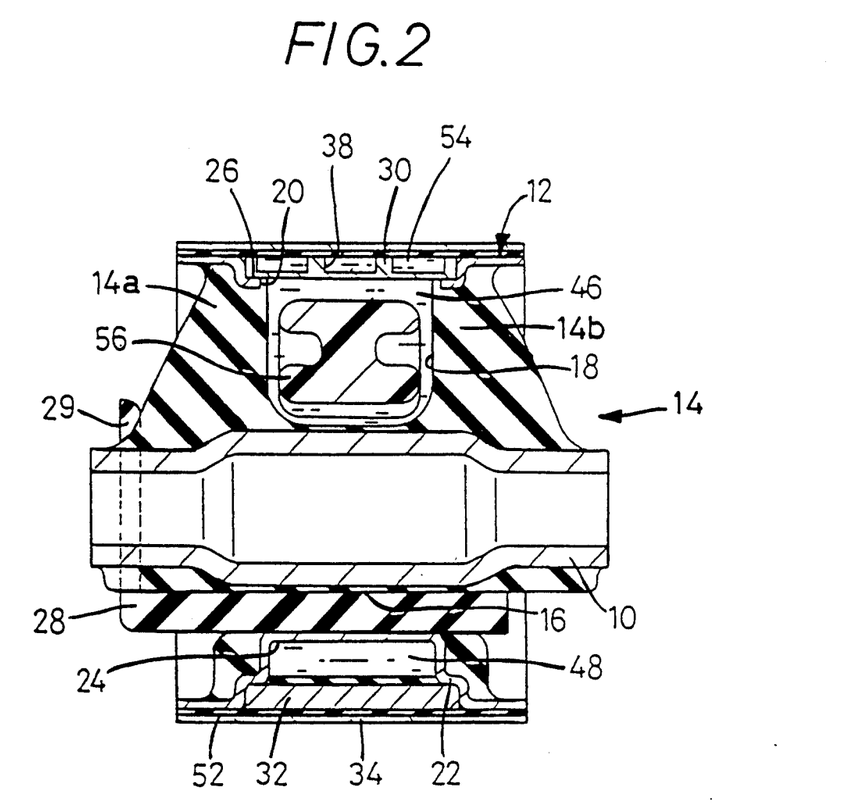
FIG. 2 is a cross sectional view taken along line 2—2 of FIG. 1.

Referring first to FIGS. 1 and 2, there is shown a cylindrical fluid-filled elastic engine mount for a motor vehicle, which is suitably manufactured by a method according to one embodiment of this invention. In these figures, reference numeral 10 denotes an inner sleeve which is made of a suitable metallic material and has a relatively large wall thickness. Radially outwardly of this inner sleeve 10, there is disposed an intermediate metallic sleeve 12 such that the inner and intermediate sleeves 10, 12 are eccentric with each other by a suitable radial distance in a load-receiving direction (vertical direction as viewed in FIG. 1) in which the engine mount primarily receives a vibrational load when installed in place on the vehicle. The inner and intermediate sleeves 10, 12 are flexibly connected to each other by an elastic body 14 interposed therebetween. As described below, the elastic body 14 is formed by vulcanization such that the elastic body 14 is bonded to the inner and intermediate sleeves 10, 12, to provide an inner unit generally indicated at 58 in FIGS. 4 and 5.

Between the intermediate sleeve 12 and the elastic body 14, there is defined an axial void 16 formed in the axial direction of the mount. As indicated in FIG. 1, this axial void 16 is located on one of diametrically opposite sides of the inner sleeve 10 as viewed in the load-receiving direction, on which the radial distance between the radial center of the inner sleeve 10 and the intermediate sleeve 12 is the smallest. The axial void 16 has a generally arcuate shape as seen in the plane of FIG. 1, which corresponds to about half of the circumference of the sleeves 10, 12. In the presence of the axial void 16, the elastic body 14 is present only on the side on which the above-indicated radial distance is relatively large, that is, only in the generally upper part of the space within the intermediate sleeve 12 as viewed in FIG. 1.

The elastic body 14 has a pocket 18 in the form of a recess open on the outer circumferential surface, and the intermediate sleeve 12 has a window 20 aligned with the opening of the pocket 18, so that the pocket 18 is open on the outer surface of the intermediate sleeve 12. The pocket 18 has an axial dimension defined by two side walls 14a, 14b which are opposed to each other in the axial direction of the inner sleeve 10 (engine mount).

As shown in FIG. 2, the intermediate sleeve 12 has an axially intermediate portion 22 which has a smaller diameter than the other portion. This axially intermediate small-diameter portion 22 has a recessed part 24 over a circumferential length corresponding to that of the arc of the axial void 16, as indicated in FIG. 1. Namely, the recessed part 24 is radially inwardly recessed as compared with the other portion of the axially intermediate portion 22, so that the bottom wall of the recessed part 24 cooperates with the elastic body 14 to define the axial void 16. Between the opposite ends of the recessed part 24, there is formed a pat-circumferential groove 26 whose bottom is defined by the above-indicated other portion of the axially intermediate portion 22. Thus, the recessed part 24 and the part-circumferential groove 26 cover the entire circumference of the intermediate sleeve 12.

With the axial void 16, there is accommodated a rebound stop 28 which is formed of a rubbery material. This rebound stop 28 has a generally arcuate shape as indicated in FIG. 1, and has an annular fixing portion 29 at one of the opposite ends, as indicated in FIG. 2. The annular fixing portion 29 is fixedly fitted on the corresponding axial end of the inner sleeve 10, whereby the rebound stop 28 is fixed to the inner sleeve 10.

Figure 4:
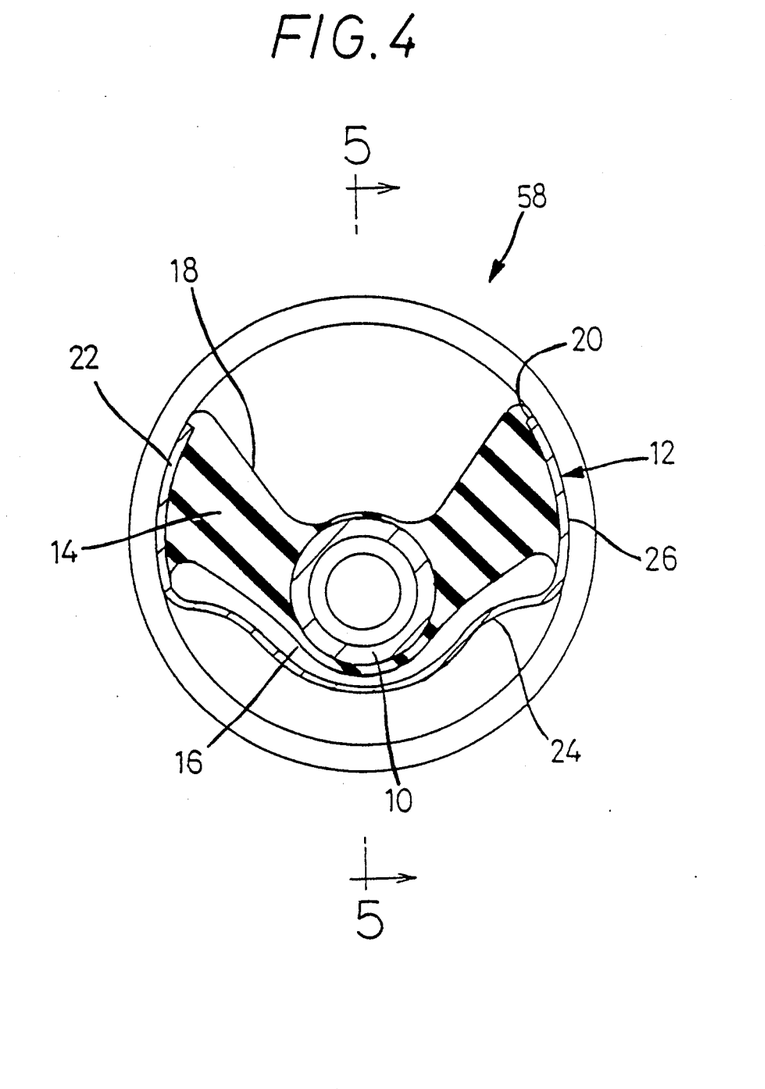
FIG. 4 is a transverse cross sectional view of an inner unit of the engine mount of FIG. 1, which is prepared by vulcanizing an elastic body between an inner and an intermediate sleeve.
Figure 5:
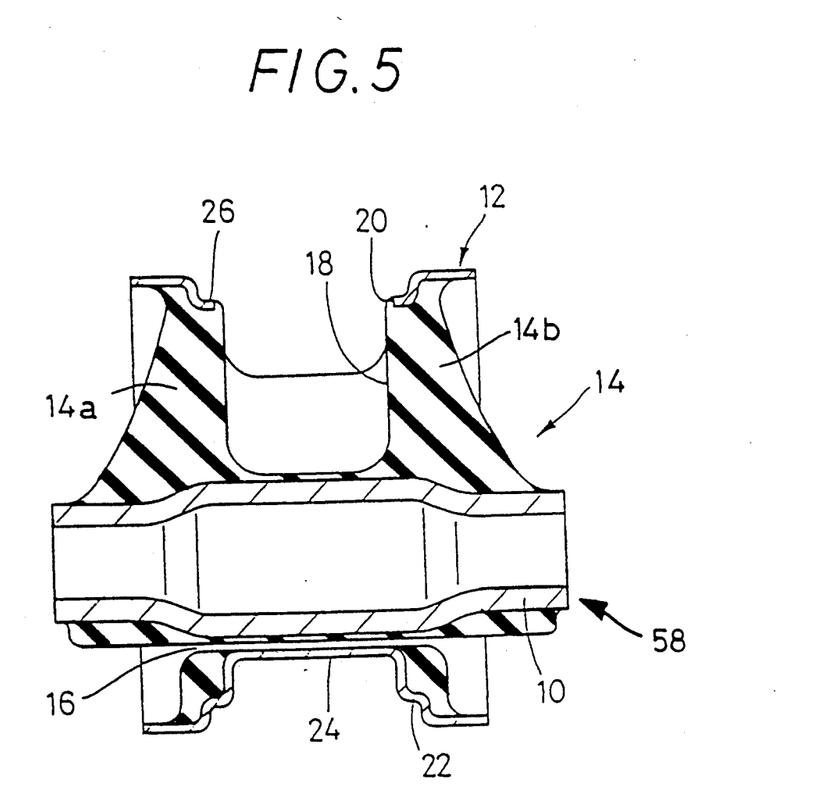
FIG. 5 is a cross sectional view taken along line 5—5 of FIG. 4.

The present engine mount also includes a first and a second orifice-defining member 30, 32, and an outer sleeve 34, which are mounted on the inner unit 58 (FIGS. 4 and 5). More specifically, the first and second orifice-defining members 30, 32 are substantially semi-cylindrical members, which are fitted in the part-circumferential groove 26, such that the first orifice-defining member 30 covers one half of the circumference of the intermediate sleeve 12 on the side of the window 20, while the second orifice-defining member 32 covers the other half on the side of the recessed part 24. The outer sleeve 34 is fitted on the outer circumferential surface of the orifice-defining members 30, 32.

Figure 6:
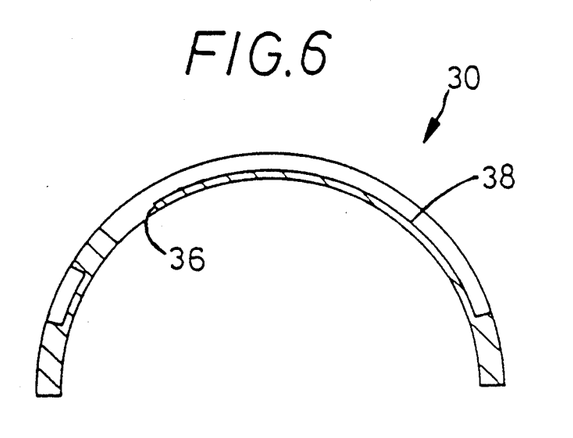
FIG. 6 is a cross sectional view of a first orifice-defining member used in the engine mount of FIG. 1.
Figure 7:
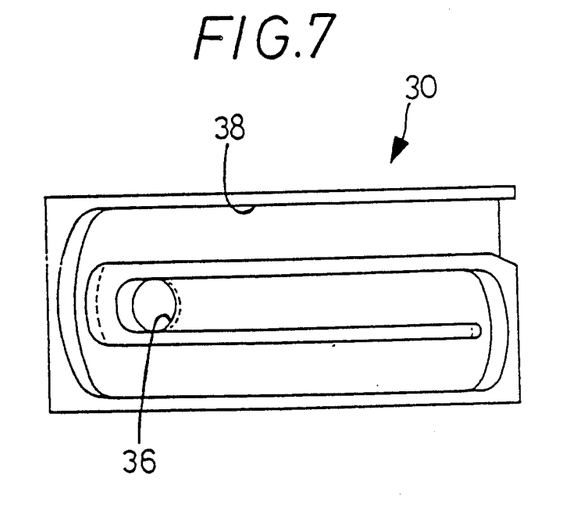
FIG. 7 is a plan view of the first orifice-defining member of FIG. 6.
Figure 8:
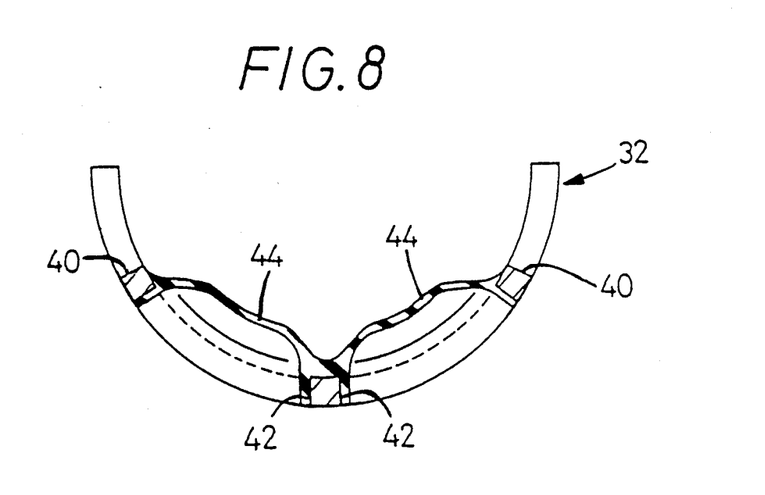
FIG. 8 is a cross sectional view of a second orifice-defining member used in the engine mount of FIG. 1.
Figure 9:
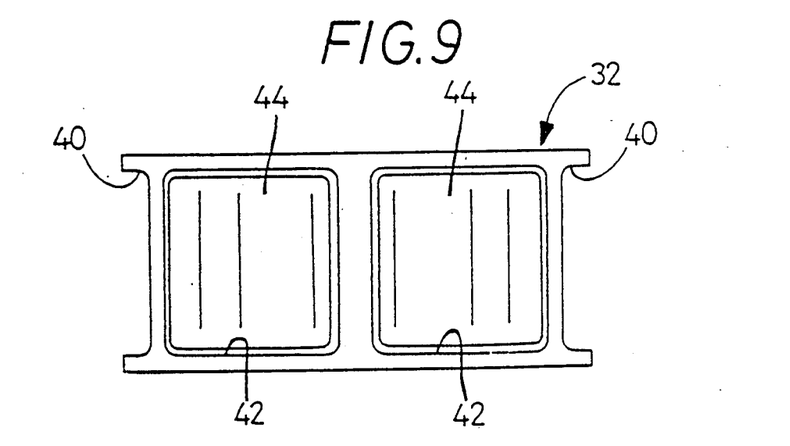
FIG. 9 is a bottom plan view of the second orifice-defining member of FIG. 8.

As shown in FIGS. 6 and 7, the first orifice-defining member 30 has a spiral groove 38 formed in the outer surface such that the inner end of the groove 38 is located substantially at the center of the surface while the outer end is open at one of the opposite ends of the member 30 as viewed in the circumferential direction of the engine mount. The inner end of the spiral groove 38 communicates with a communication hole 36 formed through the wall thickness of the orifice-defining member 30. On the other hand, the second orifice-defining member 32 has two cutouts 40, 40 at the circumferential opposite ends, and two spaced-apart rectangular windows 42, 42 between the cutouts 40, as shown in FIGS. 8 and 9. This orifice-defining member 32 is provided with an elastically deformable or flexible diaphragm 44 secured to its inside so as to fluid-tightly close the windows 42, as indicated in FIG. 8.

The pocket 18 of the elastic body 14 is fluid-tightly closed by the first orifice-defining member 30 and the outer sleeve 34, so as to provide a pressure-receiving chamber 46 filled with a non-compressible fluid. The pressure in the pressure-receiving chamber 46 is changed due to a volumetric change thereof caused by elastic deformation of the elastic body 14 when a vibrational load is applied between the inner and outer sleeves 10, 34 during use of the engine mount. Further, the recessed part 24 formed in the intermediate sleeve 12 is fluid-tightly closed by the second orifice-defining member 32 and the outer sleeve 34, whereby a variable-volume equilibrium chamber 48 also filled with the non-compressible fluid is formed. Namely, the equilibrium chamber 48 is defined between the diaphragm 44 formed on the second-orifice defining member 32, and the recessed part 24 of the intermediate sleeve 12. A change in the pressure in the equilibrium chamber 48 is absorbed or prevented by elastic deformation of the flexible diaphragm 44. Spaces 50, 50 are left between the inner surface of the outer sleeve 34 and the diaphragm 44, so that the spaces 50 permit the diaphragm 44 to undergo elastic deformation.

The non-compressible fluid filling the pressure-receiving and equilibrium chambers 46, 48 may be water, alkylene glycol, polyalkylene glycol or silicone oil. To secure high fluid-tightness of the chambers 46, 48, the inner circumferential surface of the outer sleeve 34 is entirely covered by a sealing rubber layer 52.

The pressure-receiving chamber 46 and the variable-volume equilibrium chamber 48 are held in communication with each other, through an orifice passage 54 which is defined such that the spiral groove 38 and the cutouts 40 of the first and second orifice-defining members 30, 32 are fluid-tightly closed by the inner circumferential surface of the outer sleeve 34, more precisely, by the sealing rubber layer 52 formed on the outer sleeve 34.

A movable block 56 is accommodated in the pressure-receiving chamber 46. This movable block 56 is made of a relatively rigid material, and has an outer profile similar to the configuration of the pressure-receiving chamber 46. However, the block 56 has smaller dimensions than the dimensions of the chamber 46, so that the block 56 is freely movable within the chamber 46.

Figure 3:
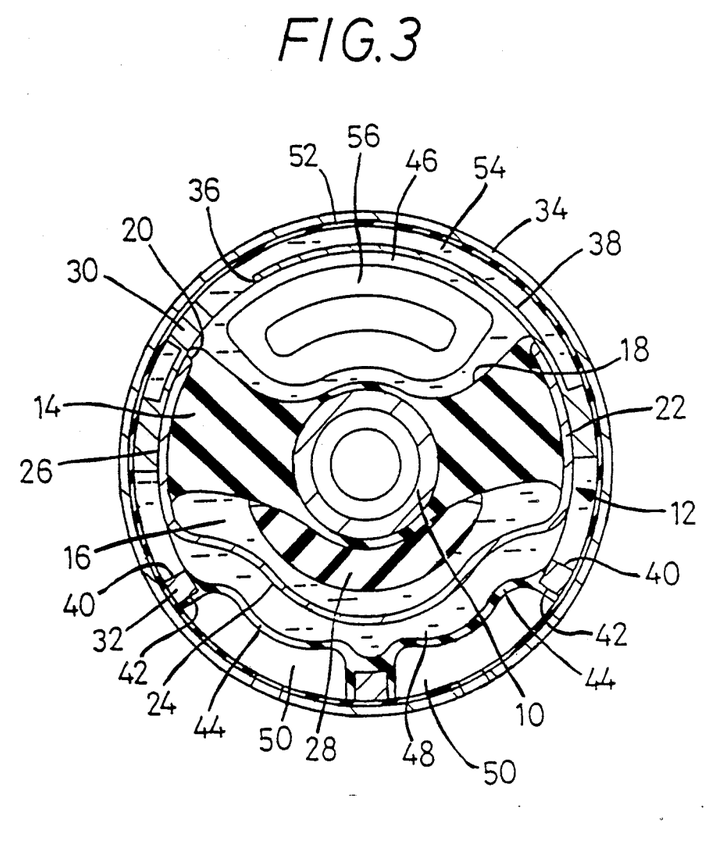
FIG. 3 is a transverse cross sectional view of the engine mount of FIG. 1, when installed on a vehicle to receive the weight of an engine unit.

The engine mount constructed as described above is installed so as to flexibly support an engine unit on a vehicle such that the inner sleeve 10 is fixed to the vehicle body while the outer sleeve 34 is fixed to the engine unit. That is, the engine mount is interposed between the vehicle body and the engine unit. In this condition, the weight of the engine unit acts as a static load on the outer sleeve 34 in the vertical direction, i.e., in the direction in which the inner and outer sleeves 10, 34 are eccentric with each other (as indicated in FIG. 1) before the engine mounted is installed. As a result, the inner and outer sleeves 10, 34 are brought into substantially concentric relation with each other, by the static load or the weight of the power unit, as indicated in FIG. 3. Therefore, during use of the engine mount, a vibrational load or dynamic load is applied between the inner and outer sleeves 10, 34 which are normally held in the substantially concentric relation as indicated in FIG. 3. As suggested above, the vibrations are received by the engine mount, primarily in the vertical direction.

When a low-frequency vibrational load such as engine shake is applied to the engine mount installed on the vehicle as described above, the fluid is forced to flow between the pressure-receiving and equilibrium chambers 46, 48 through the orifice passage 54. As a result, the engine mount effectively damps the received vibrational load, based on resonance of the fluid flowing through the orifice passage 54. Where the received rotational load has a relatively high frequency, the engine mount exhibits a sufficiently low dynamic spring constant, based on resonance of the fluid mass which flows around the movable block 56 accommodated in the pressure-receiving chamber 46.

Figure 10:
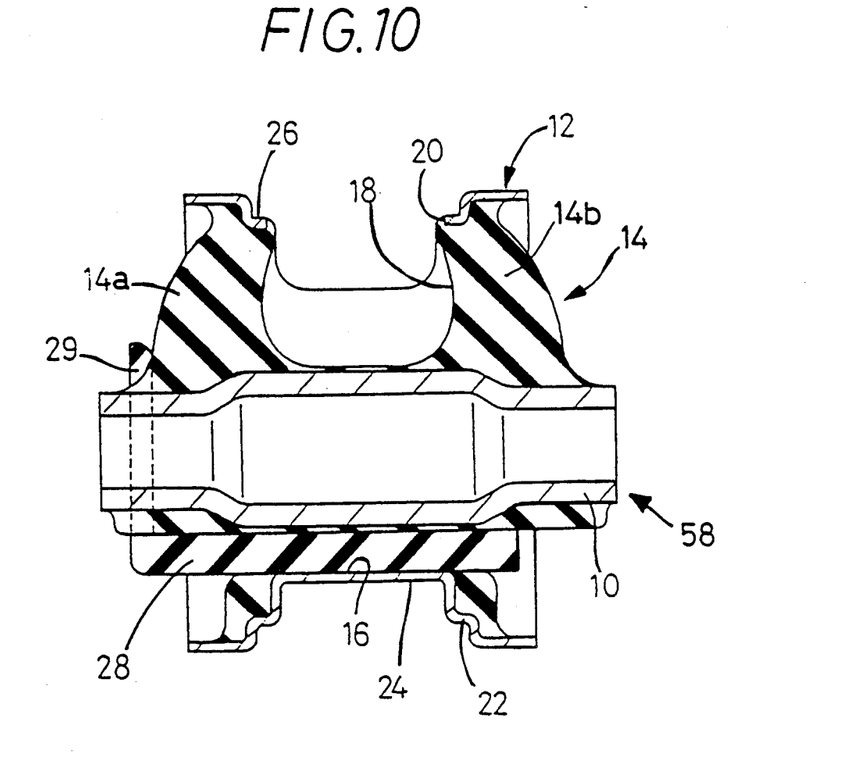
FIGS. 10, 11 and 12 are views for explaining steps of manufacture of the engine mount of FIG. 1.
Figure 11:
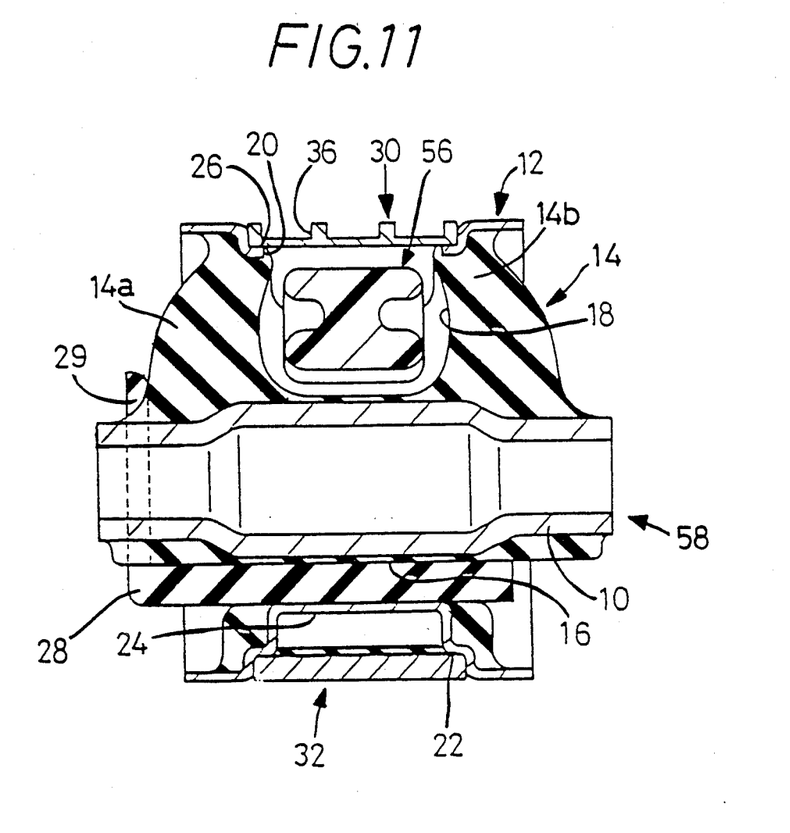
Figure 12:
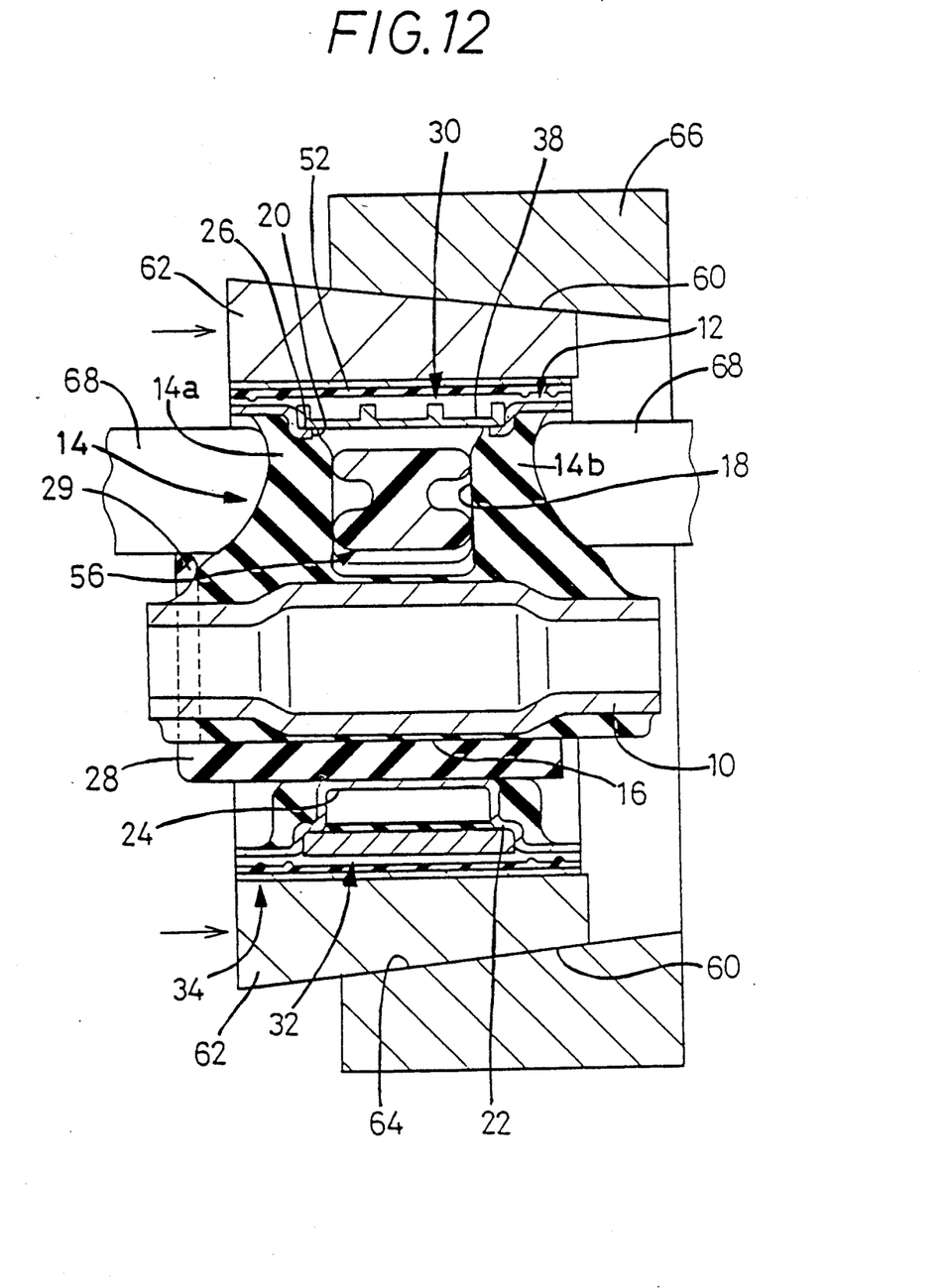

Referring next to FIGS. 10-12, there will be described in detail an exemplary method of manufacturing the engine mount constructed as described above.

Initially, the inner sleeve 10 and the intermediate sleeve 12 are positioned in the predetermined radially spaced-apart relation, within a cavity of a suitably prepared mold. Then, a selected rubber material is poured into the cavity and vulcanized in a manner well known in the art, whereby the elastic body 14 is formed so as to flexibly connect the inner and intermediate sleeves 10, 12. Thus, the inner unit 58 shown in FIGS. 4 and 5 is prepared.

In the meantime, there are prepared the generally arcuate rebound stop 28 made of a suitable elastic rubber material, the generally rectangular movable block 56, the semi-cylindrical first orifice-defining member 30 shown in FIGS. 6 and 7, the semi-cylindrical second orifice-defining member 32 shown in FIGS. 8 and 9, and the outer sleeve 34 whose inner circumferential surface is covered by the sealing rubber layer 52.

The intermediate sleeve 12 of the inner unit 58 is subjected to a drawing operation as needed to give the elastic body 14 a desired amount of radially inward pre-compression. Subsequently, the rebound stop 28 is inserted into the axial void 16 of the inner unit 58, with the annular fixing portion 29 fitted on the inner sleeve 10, as indicated in FIG. 10. In this respect, it is noted that the insertion of the rebound stop 28 will cause the inner sleeve 10 to be displaced in the direction away from the bottom of the recessed part 24 of the intermediate sleeve 12, whereby the amount of offset of the inner sleeve 10 with respect to the intermediate sleeve 12 is accordingly reduced, as is apparent from FIGS. 5 and 10. As a result of the relative displacement between the inner and intermediate sleeves 10, 12 by the insertion of the rebound stop 28, the elastic body 14 is radially inwardly compressed in the load-receiving direction (in which the static load or the weight of the vehicle engine unit and the dynamic load are applied to the engine mount).

In the next step, the movable block 56 is placed in the pocket 18 provided in the inner unit 58, and the first and second orifice-defining members 30, 32 are fitted in the part-circumferential groove 26 of the intermediate sleeve 12, as shown in FIG. 11. The first orifice-defining member 30 is aligned with the upper half of the sleeve 12 on the side of the window 20, while the second orifice-defining member 32 is aligned with the lower half on the side of the recessed part 24. The assembling of the movable block 56 and the orifice-defining members 30, 32 is effected in the atmosphere.

The thus obtained assembly 58, 28, 56, 30, 32 is then submerged in a mass of the selected non-compressible fluid, to fill the pocket 18 (subsequently formed pressure-receiving chamber 46) and the recessed part 24 (subsequently formed equilibrium chamber 48) with the non-compressible fluid. The fluid is admitted into the pocket 18 through the communication hole 36 formed through the first orifice-defining member 30, and into the recessed part 24 through the cutouts 40 provided at the ends of the second orifice-defining member 32.

The outer sleeve 34 is then mounted on the assembly 58, 28, 56, 30, 32 while it is submerged in the fluid mass. This mounting of the outer sleeve 34 is effected while the outer sleeve 34 is subjected to a radially inward drawing operation so as to force the outer sleeve 34 against the outer circumferential surfaces of the axial end portions of the intermediate sleeve 12. That is, the outer sleeve 34 is press-fitted on the assembly or intermediate sleeve 12 within the fluid mass. As a result, the pocket 18 and the recessed part 24 are fluid-tightly enclosed into the pressure-receiving chamber 46 and the equilibrium chamber 48, respectively. Also, the spiral groove 38 of the first orifice-defining member 30, and the cutouts 40 of the second orifice-defining member 32 are fluid-tightly enclosed to thereby provide the orifice passage 54 which communicates with the pressure-receiving and equilibrium chambers 46, 48. In this manner, the engine mount of FIGS. 1 and 2 is produced.

The radially inward drawing operation applied to the outer sleeve 34 is accomplished in a suitable manner known in the art. For example, an annular split die or segment die 62 and an annular one-piece die 66 as shown in FIG. 12 are used to effect the drawing operation. The segment die 62 consists of eight segments, for example, which cooperate to form a radially contractible drawing tool having a tapered outer circumferential surface 60. This segment die 62 is set such that the inner circumferential surface is in abutting contact with the outer circumferential surface of the outer sleeve 34, as indicated in FIG. 12. To perform the radially inward drawing of the outer sleeve 34, the segment die 62 is forced into the one-piece die 66, with the outer circumferential surface 60 sliding on a tapered inner circumferential surface 64 of the one-piece die 66.

The method of manufacturing the engine mount according to the present invention is characterized by an operation to exert an axial force on at least one of the axially opposite side walls 14a, 14b of the elastic body 14 while the outer sleeve 34 is subjected to the radially inward drawing operation, namely, while the outer sleeve 34 is press-fitted on the intermediate sleeve 12.

In the illustrated embodiment of FIG. 12, a pair of presser rods 68 are disposed concentrically with each other, such that the rods 68 abutting on the outer surfaces of the side walls 14a, 14b are movable toward each other in the axial direction of the engine mount (inner sleeve 10). When the segment die 62 is forced into the one-piece die 66, the two presser rods 68 are axially moved toward each other, thereby causing elastic deformation of the side walls 14a, 14b such that the side walls 14a, 14b expand toward the movable block 56, so as to reduce the volume of the pocket 18.

In the present engine mount, the amount of the non-compressible fluid filling the chambers 46, 48 and the orifice passage 54 is determined at the time when the radially inward drawing operation by the dies 62, 66 and the axially forcing operation by the presser rods 68 are terminated. That is, the charging amount of the fluid is influenced by the volume of the pocket 18 when it is closed by the outer sleeve 34 with a given amount of axial expansion of the side walls 14a, 14b toward each other. However, the elastically axially expanded side walls 14a, 14b are more or less moved by resiliency thereof away from each other toward the original positions, when the axial forces exerted on the side walls 14a, 14b are released by moving the presser rods 68 away from the side walls with the pocket 18 closed by the outer sleeve 34. Consequently, the volume of the pocket 18 (pressure-receiving chamber 46) increases by an amount corresponding to the axial movements of the side walls 14a, 14b away from each other with the rods 68 released therefrom. As a result, the fluid flows from the equilibrium chamber 48 into a pressure-receiving chamber 46, by an amount corresponding to the amount of volumetric increase of the pressure-receiving chamber 46, whereby the volume of the equilibrium chamber 48 is accordingly reduced, and the flexible diaphragm 44 is displaced substantially in the radially inward direction of the engine mount, so as to increase the volumes of the spaces 50, 50, as indicated in FIG. 1.

The thus manufactured engine mount shown in FIG. 1 is installed on the vehicle, with the weight of the engine unit (static load) acting on the outer sleeve 34, which causes reduction in the volume of the pressure-receiving chamber 46, which in turn causes the fluid to flow from the chamber 46 into the equilibrium chamber 48. The resulting increase in the volume of the chamber 48 is accommodated or absorbed by the radially outward displacement of the diaphragm 44 from the position of FIG. 1 to the position of FIG. 3. This displacement of the diaphragm 44 in the engine mount as installed is facilitated by the relatively large volumes of the spaces 50, 50 of the engine mount as manufactured.

It will be understood from the above explanation that the method of manufacturing the engine mount according to the illustrated embodiment of the invention effectively prevents an excessive amount of elastic deformation of the flexible diaphragm 44 even after the engine mount is installed in position receiving the static load, i.e., the weight of the engine unit. This indicates improved durability of the diaphragm 44 during operation of the engine mount to damp the received dynamic vibrational load.

Further, the engine mount manufactured as described above permits the equilibrium chamber 48 to undergo a sufficiently large amount of volumetric change, owing to the relatively large volumes of the spaces 50, 50 left in the engine mount. Accordingly, the equilibrium chamber 48 is capable of attaining the assigned function even when vibrations having a relatively large amplitude are applied between the inner and outer sleeves 10, 34. Thus, the engine mount exhibits improved damping capability and stability, based on resonance of the fluid mass flowing through the orifice passage 54 between the two chambers 46, Further, the amount of volumetric reduction of the pressure-receiving chamber 46 caused by the application of the static load (engine unit weight), and the amount of consequent volumetric increase of the equilibrium chamber 48 can be effectively restricted by the provision of the rebound stop 28, which gives a certain amount of radial pre-compression to the elastic body 14 in the direction in which the static load is applied. This also contributes to the relatively large amount of volumetric change of the equilibrium chamber 48 that can occur on the installed engine mount.

While the present invention has been described in detail in its presently preferred embodiment, it is to be understood that the invention is not limited to the details of the illustrated embodiment.

For example, the movable block 56 and the first and second orifice-defining members 30, 32 can be assembled on the inner unit 58, while the inner unit 58 is submerged in the mass of the non-compressible fluid.

In the illustrated method, the radially inward drawing operation on the outer sleeve 34 is carried out as described above and as illustrated in FIG. 12, the outer sleeve 34 can be radially inwardly drawn by various other methods known in the art.

Although axial forces are applied to both of the opposed side walls 14a, 14b of the elastic body 14 in the axially opposite directions of the engine mount, it is possible that only one of the two side walls is subjected to an axial force for elastic deformation of that one side wall toward the other side wall.

It is also noted that the method of the present invention is applicable to a fluid-filled elastic mount whose construction is different from that of the illustrated engine mount. For instance, the engine mount may employ various conventional arrangements for defining the orifice passage and equilibrium chamber. Further, the movable block 56 and the rebound stop 28 are not essential to the engine mount to which the present invention is applicable. The principle of the present invention is equally applicable to any fluid-filled elastic mounts other than the engine mount, for example, to a differential gear mount and a suspension bushing for motor vehicles, and even applicable to fluid-filled vibration damping/isolating components as cylindrical dampers used for various devices or equipment other than those used for motor vehicles. In particular, the invention is effectively applicable to a fluid-filled elastic mount which receives a static load as well as a dynamic load.

It is to be understood that the present invention may be embodied with various other changes, modifications and improvements, which may occur to those skilled in the art, without departing from the spirit and scope of the invention defined in the following claims.

What is claimed is:

1. A method of manufacturing a fluid-filled elastic mount which includes an elastic body flexibly connecting an inner and an outer sleeve which are radially spaced apart from each other, means for defining a pressure-receiving chamber and a variable-volume equilibrium chamber which are formed between the inner and outer sleeves and which are filled with a non-compressible fluid, and means for defining an orifice for fluid connection between the pressure-receiving and equilibrium chambers, said equilibrium chamber being at least partially defined by a flexible diaphragm, comprising the steps of:

preparing an inner unit including said inner sleeve and an intermediate sleeve disposed radially outwardly of the inner sleeve, such that said inner and intermediate sleeves are flexibly connected to each other by said elastic body formed therebetween, and such that a pocket is formed in said elastic body such that said pocket is open on an outer circumferential surface of said inner unit through said intermediate sleeve and such that an axial dimension of said pocket in an axial direction of the elastic mount is defined by opposite side walls of the elastic body which are opposed to each other in said axial direction;

placing said inner unit within a mass of said non-compressible fluid, and press-fitting said outer sleeve on said inner unit so as to fill said pocket with said fluid and fluid-tightly close said pocket for thereby providing said pressure-receiving chamber, while applying an axial force to at least one of said opposite side walls of said elastic body in said axial direction, to thereby cause elastic deformation of said at least one side wall so as to expand into said pocket; and removing said axial force from said at least one side wall, to permit said at least one side wall to elastically deform so as to increase a volume of said pressure-receiving chamber, thereby reducing a volume of said equilibrium chamber.

2. A method according to claim 1, wherein said axial force is applied to said at least one side wall of the elastic body, by moving at least one presser rod in said axial direction of the elastic mount while one end of each of said at least one presser rod is held in abutting contact with a corresponding one of said at least one side wall.

3. A method according to claim 1, wherein said axial force is applied to both of said opposite side walls of the elastic body.

4. A method according to claim 3, wherein said axial force is applied to both of said opposite side walls by moving a pair of presser rods toward each other in said axial direction of the elastic mount while one end of each of said presser rods is held in abutting contact with a corresponding one of said opposite side walls.

5. A method according to claim 1, wherein said outer sleeve is press-fitted on said inner unit while said outer sleeve is subjected to a radially inward drawing operation and while said axial force is applied to said at least one side wall of the elastic body.

6. A method according to claim 1, wherein said step of preparing said inner unit includes inserting a rebound stop between a portion of said intermediate sleeve which partially defines said equilibrium chamber, and said inner sleeve, so as to give a predetermined amount of pre-compression to a portion of said elastic body in which said pocket is formed.

7. A method according to claim 1, wherein said step of preparing said inner unit includes forming said flexible diaphragm such that said flexible diaphragm is secured to an orifice-defining member which is fitted on said intermediate sleeve such that said flexible diaphragm and said intermediate sleeve cooperate to define said equilibrium chamber when said outer sleeve is fitted on said inner unit.

8. A method according to claim 1, wherein said step of preparing said inner unit includes forming said elastic body such that said inner and intermediate sleeves are eccentric with respect to each other such that a radial distance between a radial center of said inner sleeve and said intermediate sleeve in a direction in which a static and a dynamic load are applied to said pressure-receiving chamber is smaller on the side of said flexible diaphragm than on the side of said pocket.

* * * * *